United States Patent
Shafer (10) Patent No.: US 11,428,592 B1
(45) Date of Patent: Aug. 30, 2022

(54) FLEXIBLE SENSOR

(71) Applicant: X Development LLC, Mountain View, CA (US)

(72) Inventor: Alexander Shai Shafer, San Francisco, CA (US)

(73) Assignee: X Development LLC, Mountain View, CA (US)

(*) Notice: Subject to any disclaimer, the term of this patent is extended or adjusted under 35 U.S.C. 154(b) by 78 days.

(21) Appl. No.: 17/129,545

(22) Filed: Dec. 21, 2020

Related U.S. Application Data (63) Continuation of application No. 16/535,257, filed on Aug. 8, 2019, now Pat. No. 10,900,853, which is a continuation of application No. 16/243,731, filed on Jan. 9, 2019, now Pat. No. 10,451,505, which is a continuation of application No. 15/816,028, filed on Nov. 17, 2017, now Pat. No. 10,190,928.

(60) Provisional application No. 62/423,382, filed on Nov. 17, 2016.

(51) Int. Cl.
*G01L 5/165* (2020.01)
*G01L 5/22* (2006.01)
*B25J 13/08* (2006.01)

(52) U.S. Cl.
CPC .......... *G01L 5/165* (2013.01); *B25J 13/085* (2013.01); *G01L 5/226* (2013.01)

(58) Field of Classification Search
CPC ......... G01L 5/165; G01L 5/226; B25J 13/085
USPC ................................................... 73/862.337
See application file for complete search history.

(56) References Cited

U.S. PATENT DOCUMENTS

| | | | |
|---|---|---|---|
| 5,159,301 A | 10/1992 | Kaida | |
| 5,373,269 A | 12/1994 | Kaida | |
| 5,434,547 A | 7/1995 | Kaida | |
| 5,510,581 A | 4/1996 | Angel | |
| 5,824,900 A | 10/1998 | Konno | |
| 5,998,911 A | 12/1999 | Kikuchi | |
| 6,018,997 A | 2/2000 | Kumada | |
| 6,205,857 B1 | 3/2001 | Nakajima | |
| 6,610,528 B1 | 8/2003 | Mathur et al. | |
| 6,955,097 B1 | 10/2005 | Madni et al. | |
| 7,187,518 B2 | 3/2007 | Hong | |
| 7,710,126 B2 * | 5/2010 | Morimoto | G01L 5/165 |
| | | | 324/661 |
| 7,944,008 B2 | 5/2011 | Parks | |
| 8,590,403 B2 | 11/2013 | Ohuchi | |

(Continued)

FOREIGN PATENT DOCUMENTS

CN 109855772 * 6/2019

*Primary Examiner* — Octavia Davis Hollington
(74) *Attorney, Agent, or Firm* — McDonnell Boehnen Hulbert & Berghoff LLP (57) ABSTRACT

A flexible sensor that includes a printed circuit board (PCB), a capacitive structure on the PCB, and mechanical coupling sites. The PCB includes a slot extending from an outer edge of the PCB to an inner portion of the PCB, and the slot defines a first edge and a second edge facing the first edge. The first and second edges are separated by a gap when the PCB is in an unflexed state. The slot is configured to permit the PCB to flex so as to vary a relative position of the first edge with respect to the second edge. The capacitive structure on the PCB includes a first edge electrode on a portion of the first edge of the PCB, and a second edge electrode on a portion of a second edge of PCB. The second edge electrode is aligned with the first edge electrode across the slot.

20 Claims, 6 Drawing Sheets

(56) References Cited

U.S. PATENT DOCUMENTS

| | | |
|---|---|---|
| 9,299,912 B2 | 3/2016 | Matsuo |
| 10,190,928 B1 | 1/2019 | Shafer |
| 10,451,505 B1 | 10/2019 | Shafer |
| 10,900,853 B1 * | 1/2021 | Shafer .................... G01L 5/226 |
| 2006/0081070 A1 | 4/2006 | Madni et al. |
| 2011/0314935 A1 | 12/2011 | Krippner et al. |
| 2013/0126325 A1 | 5/2013 | Curtis et al. |
| 2014/0239984 A1 | 8/2014 | Alameh et al. |
| 2015/0323398 A1 | 11/2015 | Lauzier et al. |
| 2016/0037625 A1 | 2/2016 | Huitenna |

* cited by examiner

FLEXIBLE SENSOR

CROSS-REFERENCE TO RELATED APPLICATION

This application is a continuation of U.S. patent application Ser. No. 16/535,257, entitled "Flexible Sensor," filed Aug. 8, 2019, which is a continuation of U.S. patent application Ser. No. 16/243,731, entitled "Flexible Sensor," filed Jan. 9, 2019, now U.S. Pat. No. 10,451,505, which is a continuation of U.S. patent application Ser. No. 15/816,028, entitled "Flexible Sensor For Measuring Flex Or Torque," filed Nov. 17, 2017, now U.S. Pat. No. 10,190,928, which claims the benefit under 35 U.S.C. § 119(e) of U.S. Patent Application No. 62/423,382, entitled "Flexible Sensor," filed Nov. 17, 2016, all of which are incorporated herein by reference in their entirety.

TECHNICAL FIELD

This disclosure generally relates mechanical sensors, and more particularly to mechanical sensors for measuring mechanical flex and torque in a structural member or mechanical joint.

BACKGROUND

Mechanical sensors are used to measure physical variations in mechanical devices and mechanical structures. Mechanical sensors can measure flexure, stress, and torque in mechanical devices and structures. Some sensors convert mechanical displacement into electrical values through changes in resistance and capacitance of electrical components in the sensors.

SUMMARY

This disclosure describes flexible sensors for measuring the flex or torque of mechanical structures or mechanical joints, such as actuable joints of a robotic device. In addition, this disclosure describes systems and methods for measuring flex or torque in mechanical structures or joints using a flexible sensor.

In general, innovative aspects of the subject matter described in this specification can be embodied in flexible sensor that includes a printed circuit board (PCB), a capacitive structure on the PCB, and mechanical coupling sites. The PCB includes a slot extending from an outer edge of the PCB to an inner portion of the PCB, and the slot defines a first edge and a second edge facing the first edge. The first and second edges are separated by a gap when the PCB is in an unflexed state. The slot is configured to permit the PCB to flex so as to vary a relative position of the first edge with respect to the second edge. The capacitive structure on the PCB includes a first edge electrode on a portion of the first edge of the PCB, and a second edge electrode on a portion of a second edge of PCB. The second edge electrode is aligned with the first edge electrode across the slot. The mechanical coupling sites are arranged on the PCB such that mechanical variations in a structure to which the sensor is attached cause the PCB to flex and vary the relative position of the first edge electrode with respect to the second edge electrode. This and other implementations can each optionally include one or more of the following features.

In some implementations, the sensor includes a control circuit electrically connected to the first edge electrode and the second edge electrode, where the control circuit configured to apply a drive signal to the capacitive structure.

In some implementations, the sensor includes a control circuit electrically connected to the capacitive structure and configured to measure variations in a capacitance between the first edge electrode and the second edge electrode.

In some implementations, the control circuit is further configured to determine an amount of mechanical flex in a structure to which the coupling sites of the PCB are attached based on the measured variations in the capacitance of the capacitive structure.

In some implementations, the control circuit is a microprocessor.

In some implementations, the control circuit determines an amount of mechanical flex in a structure by correlating a measured variation in capacitance of the capacitive structure to a flexure value among a set of stored values in a lookup table.

In some implementations, the coupling sites are arranged on opposite sides of the slot.

In some implementations, the portion of the first edge of the PCB and the portion of the second edge of the PCB are proximate to the outer edge of the PCB.

In some implementations, a first coupling site is located proximate to the outer edge of the PCB and a second coupling site is located on a same side of the slot as the first coupling site and spaced from the first coupling site along a length of the slot.

Some implementations include a robotic device where the sensor is mounted on a member of the robotic device.

Particular implementations of the subject matter described in this specification can be implemented so as to realize one or more of the following advantages. Implementations may provide economically inexpensive flex/torque sensors because the sensors may be simply formed from inexpensive, widely-available materials. Implementations may provide flex/torque sensors that can readily be incorporated into electronic printed circuit boards of a self-actuating mechanical device such as a robotic device. Implementations may provide flex torque sensors that do not require metallic housings.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

In general, this disclosure describes flexible sensors for measuring the flex or torque of mechanical structures or mechanical joints. In general, flexible sensors include a substrate with a slot extending from an edge of the substrate to an inner portion of the substrate, and thereby, forming a flexible arm in the substrate. The sensor includes a capacitive structure formed by edge electrodes located on facing edge surfaces defined by the slot. The sensor also includes two or more mechanical coupling sites along the length of the slot. When the substrate is in an unflexed state, the electrodes are separated by a gap and the capacitance between the two electrodes can be measured. The coupling sites are located on the substrate such that when a structure to which the sensor is mechanically coupled flexes or twists the flexible arm of the substrate is displaced by a corresponding distance. For example, a structure to which the sensor is mechanically coupled may flex or twists due to a mechanical force (e.g., a load force) or torque on the structure. In such an instance, the flexible arm of the substrate is displaced by a distance that corresponds with the amount of flex or twist in the structure that is caused by the mechanical force or torque. The flex in the substrate causes a change in the relative position of the edge electrodes with respect to one another, which in turn changes the capacitance of the capacitive structure. Control circuitry coupled to the sensor can measure the changes in capacitance and correlate such changes with a value of flex or torque in the mechanical structure to which the sensor is coupled.

Figure 1A:
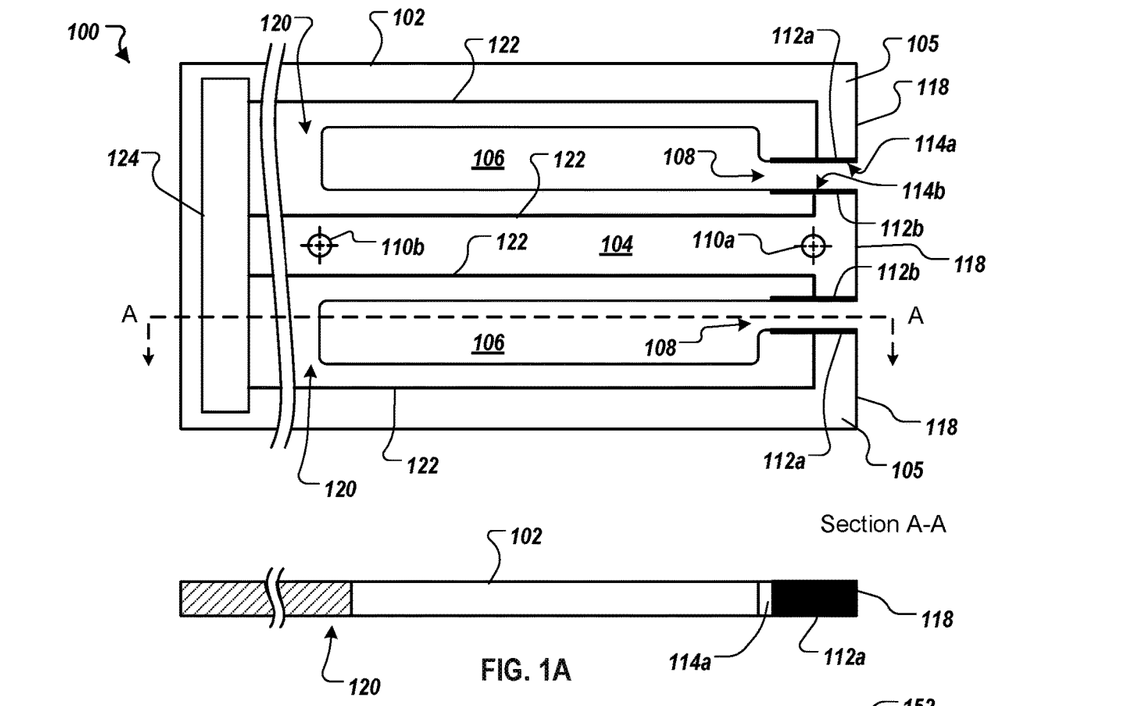
FIG. 1A shows a top view and a cross-sectional view of an example flexible sensor.

FIG. 1A shows a top view and a cross-sectional view (at section A-A) of an example flexible sensor 100. The sensor 100 is constructed from a flexible substrate 102. For example, the substrate 102 can be a plastic substrate such as a printed circuit board (PCB). The substrate can be made of materials including, but not limited to, polymers, elastomers, epoxies and urethanes, or synthetic rubber. The substrate 102 includes a flexible arm 104 and two stationary arms 105. The flexible and stationary arms 104, 105 are formed by two slots 106 in the substrate 102. Capacitive structures 108 are located on opposing inner surfaces of the slots 106. Additionally, the sensor 100 includes two mechanical coupling sites 110a, 110b by which the sensor 100 can be secured to a mechanical structure or across a mechanical joint. The capacitive structures 108 are electrically connected to sensor control circuitry (e.g., a sensor controller 124) by wire traces 122.

The slots 106 extend from an outer edge 118 of the substrate 102 to an inner portion 120 of the substrate 102. The length of the slot 106, as referred to herein, is the distance from the edge 118 of the substrate to the end of the slot at the inner portion 120 of the substrate 102. The width of a slot 106 near the inner portion 120 of the substrate 102 is larger than the width of the slot 106 near the outer edge 118 of the substrate 102. In some examples, the width of the slot near the outer edge 118 of the substrate 102 is between 0.2-0.3 mm, between 0.1-0.4 mm, or between 0.1-1.0 mm.

The capacitive structures 108 are located at the end of each slot 106 near the outer edge 118 of the substrate 102. The capacitive structures 108 are each formed by electrodes 112a, 112b. The electrodes 112a, 112b are each located on inner edge surfaces 114a, 114b of the substrate 102 inside the slot 106. When the substrate is in an unflexed state (as shown in FIG. 1A), the electrodes 112a, 112b and inner surfaces 114a, 114b are aligned and face each other. The electrodes 112a, 112b can be formed, for example, by plating electrically conductive material along a portion of the respective inner surfaces 114a, 114b. Suitable electrically conductive materials for forming the electrodes 112a, 112b include, but are not limited to, gold, aluminum, copper, tin, nickel, or a combination of materials.

The electrodes 112a, 112b are separated by the distance across the slot 106. Specifically, the electrodes 112a, 112b are separated by the width across the slot 106 near the outer edge of the substrate 102. Consequently, the capacitive structures have a capacitance, when the substrate 102 is in an unflexed state, that is defined by the area of the electrodes 112a, 112b and the distance between the electrodes 112a, 112b across the slot 106. Any variation in the position of one of the electrodes 112a, 112b relative to the other will tend to vary the capacitance of the capacitive structures 108.

The mechanical coupling sites 110a, 110b are arranged on the substrate 102 such that mechanical variations in a structure to which the sensor 100 is attached will cause the substrate 102 to flex and vary the relative position of electrode 112a with respect to electrode 112b. In the sensor 100, shown in FIG. 1A the mechanical coupling sites 110a, 110b are arranged such that one coupling site 110a is located on the flexible arm 104 near the outer edge 118 of the substrate 102 and a second coupling site 110b is spaced from the first coupling site 110a along the length of a slot 106. The second coupling site 110b can be located near or past end of the slot 106 located at the inner portion 120 of the substrate 102.

Figure 1B:
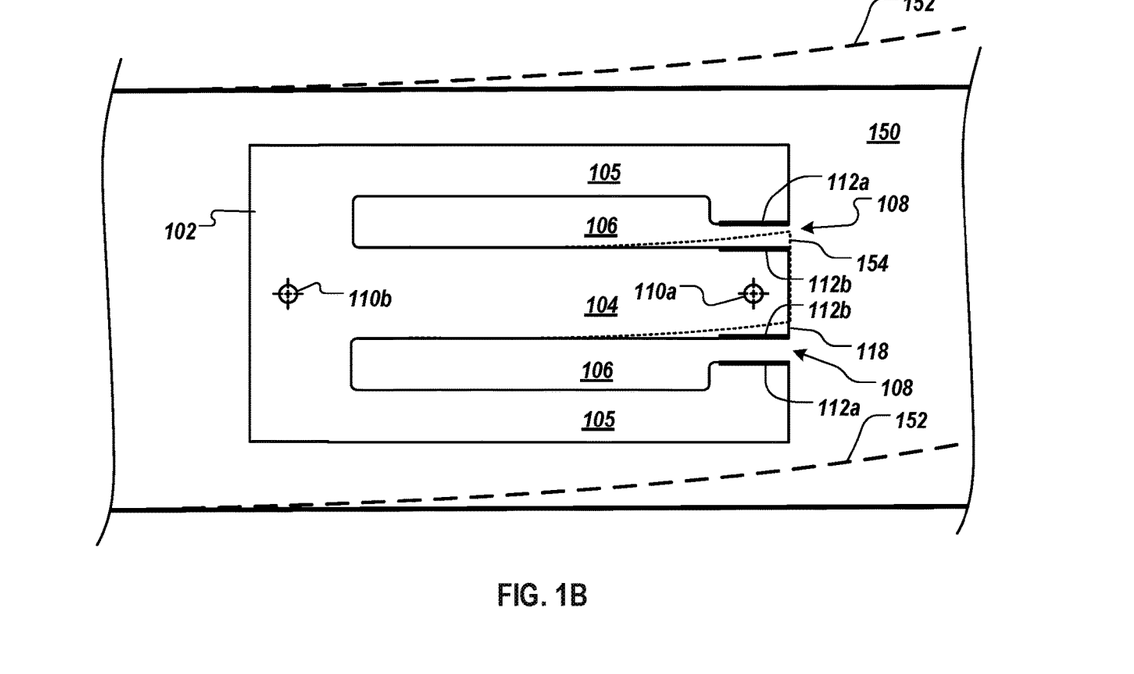
FIG. 1B depicts an example operation of the example flexible sensor.

Referring to FIG. 1B, the sensor 100 is secured to a mechanical structure 150 at the coupling sites 110a, 110b by using a mechanical coupler (e.g., a screw, a rivet, a mechanical adhesive, a weld, a pin, or a clamping device). When the mechanical structure 150 is flexed (as illustrated by dashed lines 152) the end of the flexible arm 104 is also flexed (as illustrated by dashed lines 154). The flex in the flexible arm 104 of the substrate 102 alters the position of the electrodes 112a, 112b with respect to each other in each of the capacitive structures 108, thereby, changing the respective capacitance of each capacitive structure 108. The sensor controller 124 can detect such changes in capacitance of the capacitive structures 108 and correlate the change to a flex value associated with mechanical structure 150.

In a sensor with two capacitive structures 108, such as sensor 100 shown, the capacitance of each capacitive structure 108 may vary differently. For example, as the distance between the electrodes 112a, 112b of the upper capacitive structure 108 decreases due to the movement of the flexible arm 104 towards the upper stationary arm 105, the capacitance of the upper capacitive structure 108 will tend to increase. On the other hand, as the distance between the electrodes 112a, 112b of the lower capacitive structure 108 increases due to the movement of the flexible arm 104 away from the lower stationary arm 105, the capacitance of the lower capacitive structure 108 will tend to decrease.

In some implementations, the sensor controller 124 can compute a difference between the changes in capacitance of the two capacitive structures 108 and determine the direction of the flex in the mechanical structure 150 based on the sign of the change. For example, a positive differential change in capacitance between the upper capacitive structure 108 and the lower capacitive structure 108 may indicate an upward flex in the mechanical structure 150 (e.g., as shown), where as a negative differential change in capacitance may indicate a downward flex. The sensor controller 124 correlate the magnitude of the differential change to an amount flexure in the mechanical structure 150 or a stress (e.g., a bending stress) in the mechanical structure 150.

While sensor 100 includes a single flexible arm 104, in general sensors may include more than one flexible arm. For example, a larger sensor can be constructed that includes three or more slots 106 forming two or more flexible arms 104. In some examples, the sensor 100 can be constructed with only one slot 106. For example, a sensor 100 can be formed from half of the sensor 100 shown in FIG. 1A, that includes only one slot 106 and one capacitive structure 108.

In some implementations, the sensor 100 can be integrated into a PCB including other circuitry not related to the operation of the PCB. For example, because the sensor designs illustrated and described herein can be formed in a PCB any such a sensor 100 can be integrated into any PCB that is used for control circuitry of the mechanical device. More specifically, any of the sensors described herein can be integrated into a PCB that is used for another independent purpose by forming the structure of one of the sensors at an edge of the PCB. For example, according to some implementations the sensor controller 124 shown in FIG. 1A may represent not only the sensor's control circuitry, but also additional circuitry that is unrelated to the operation of the sensor 100.

Figure 1C:
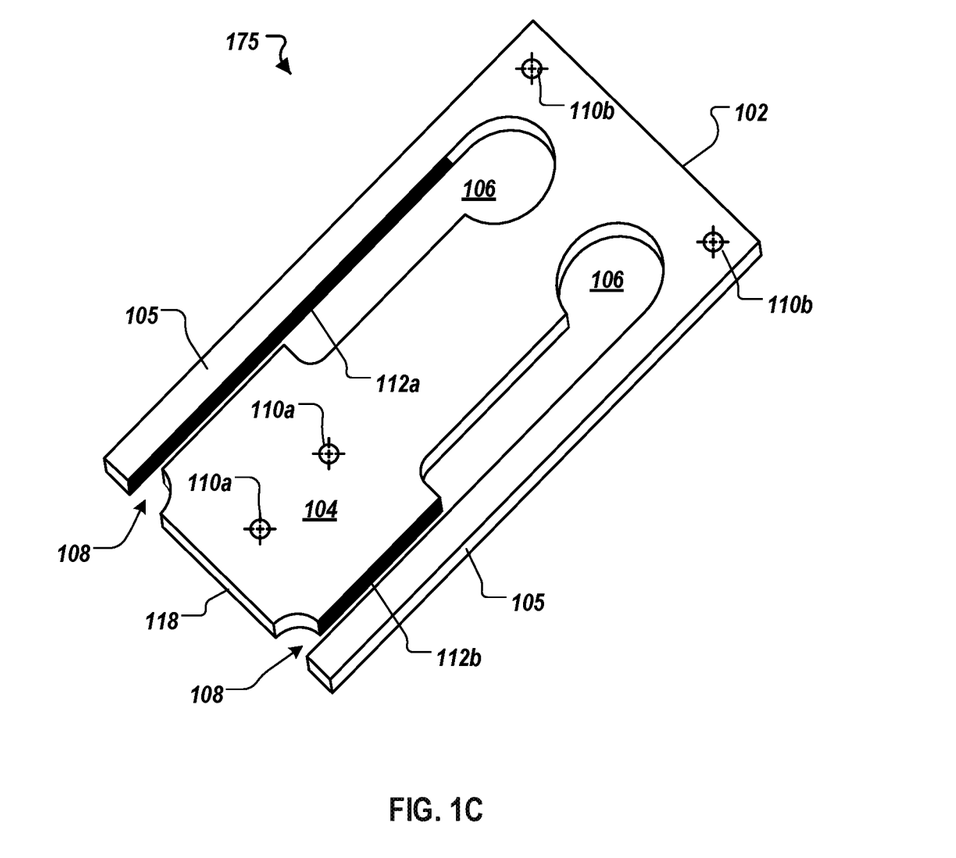
FIG. 1C shows an isometric view of a second example flexible sensor.

FIG. 1C shows an isometric view of a second example flexible sensor 175. The sensor 175 represents a variation to the design of that shown in FIGS. 1A and 1B. The flexible sensor 175 includes four mechanical coupling sites 110a, 110b. Two mechanical coupling sites 110a are located on the flexible arm 104 and two 110b are spaced apart from each other and located at the inner portion of the substrate 102. The shape of the slots 106 of the flexible sensor 175 are modified from that of flexible sensor 100. For example, the shape of slots 106 and the thickness of flexible arms 104 may be modified to accommodate stresses or an amount of flex that a sensor 100 is expected to encounter in a particular application. That is, slots 106 may be made larger or flexible arms 104 may be made thinner, or both, in a sensor 100 designed to accommodate a larger range of flexural displacement (e.g., +/−100 microns) than a sensor 100 designed to accommodate a narrower range of flexural displacement (e.g., +/−10 microns). In addition, the electrodes 112a on the fixed arm 105 (e.g., inner surface 114a of the slots 106) can extend the entire length of the slot or a substantial portion (e.g., 90% or more) of the length of the slot 106.

With respect to sensor 175 and sensor 100, the flexible arm 104 can generally be considered to be the arm(s) 104 that include one or more mechanical coupling sites 110a located at the end of the arm 104 near the outer edge 118 of the substrate 102. The stationary arm(s) 105 can generally be considered to be the arm(s) 105 that do not include mechanical coupling sites 110a located at the end of the arm 105 near the outer edge 118 of the substrate 102.

Figure 2:
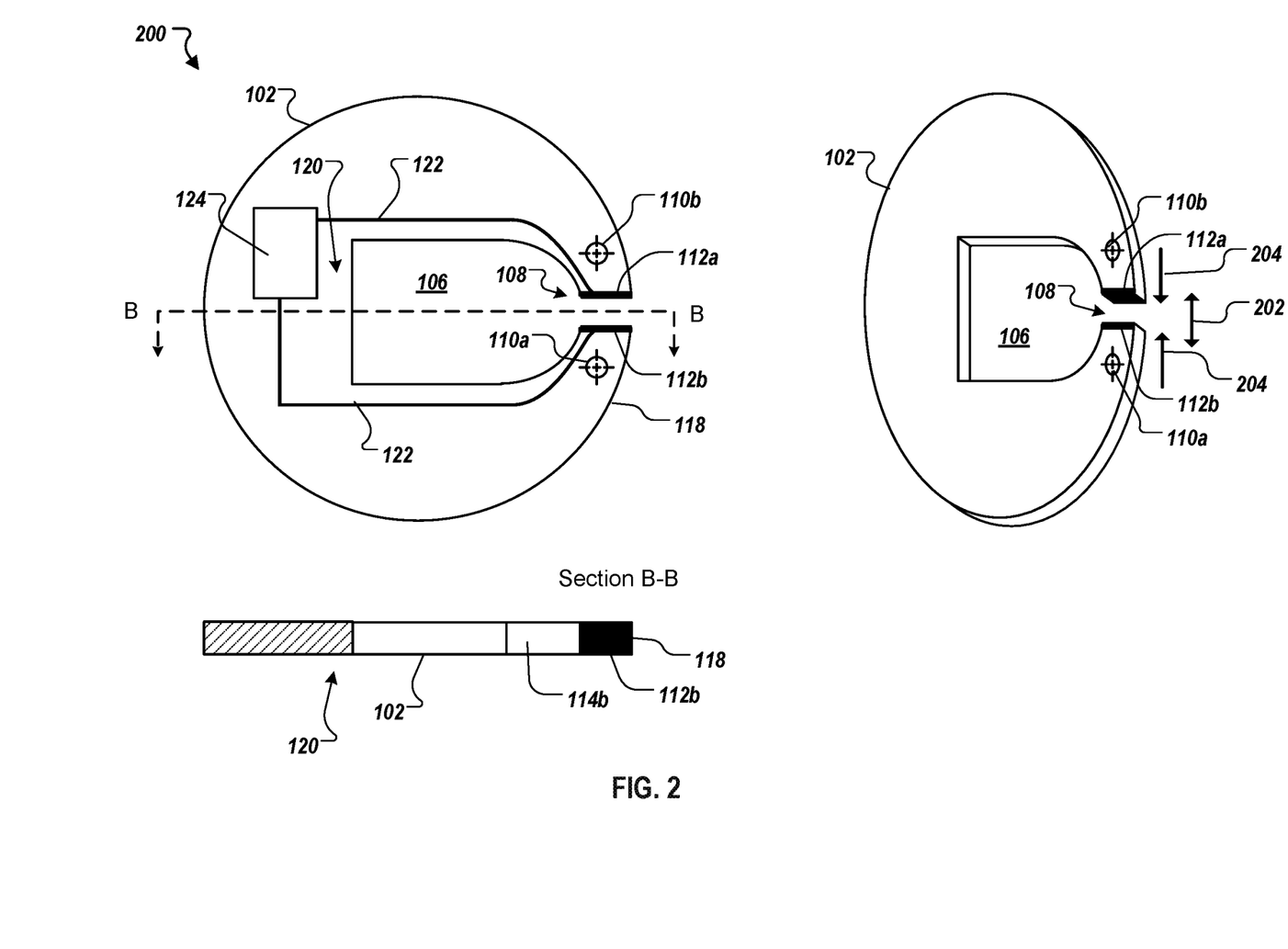
FIG. 2 shows a top view, cross-section view, and isometric view of a third example flex sensor.

FIG. 2 shows a top view, cross-section view (at section B-B), and isometric view of a third example flex sensor 200. The flex sensor 200 represents another variation to the design of that shown in FIGS. 1A and 1B. Flex sensor 200 has a generally elliptically shaped substrate 102 and includes only one slot 106 and one capacitive structure 108. The mechanical coupling sites 110a, 110b are located on opposite sides of the slot. In some implementations, the flexible sensor 200 can be used to measure torque across a mechanical joint coupling two separate mechanical structures. For example, one of the mechanical coupling sites 110a can be coupled to a first mechanical structure and the other mechanical coupling site 110b can be coupled to a second mechanical structure. The joint between the two structures may, for example, extend through the slot 106 in the sensor 200.

Any torque force exerted on the joint will flex the substrate 102 and cause one or both of the electrodes 112a, 112b to move with respect to the other. For example, the electrodes 112a, 112b may be either squeezed or separated as shown by arrows 202 and 204. For example, a counter clockwise torque exerted on the lower coupling site 110b would cause the distance between the two electrodes 112a, 112b to decrease and consequently increase the capacitance of the capacitive structure 108. As another example, a clockwise torque exerted on the lower coupling site 110b would cause the distance between the two electrodes 112a, 112b to increase and consequently decrease the capacitance of the capacitive structure 108. Thus, in some implementations, the sensor controller 124 can determine a direction of torque based on whether the capacitance increases or decreases and a magnitude of torque based on the magnitude of the change in the capacitance.

Figure 3:
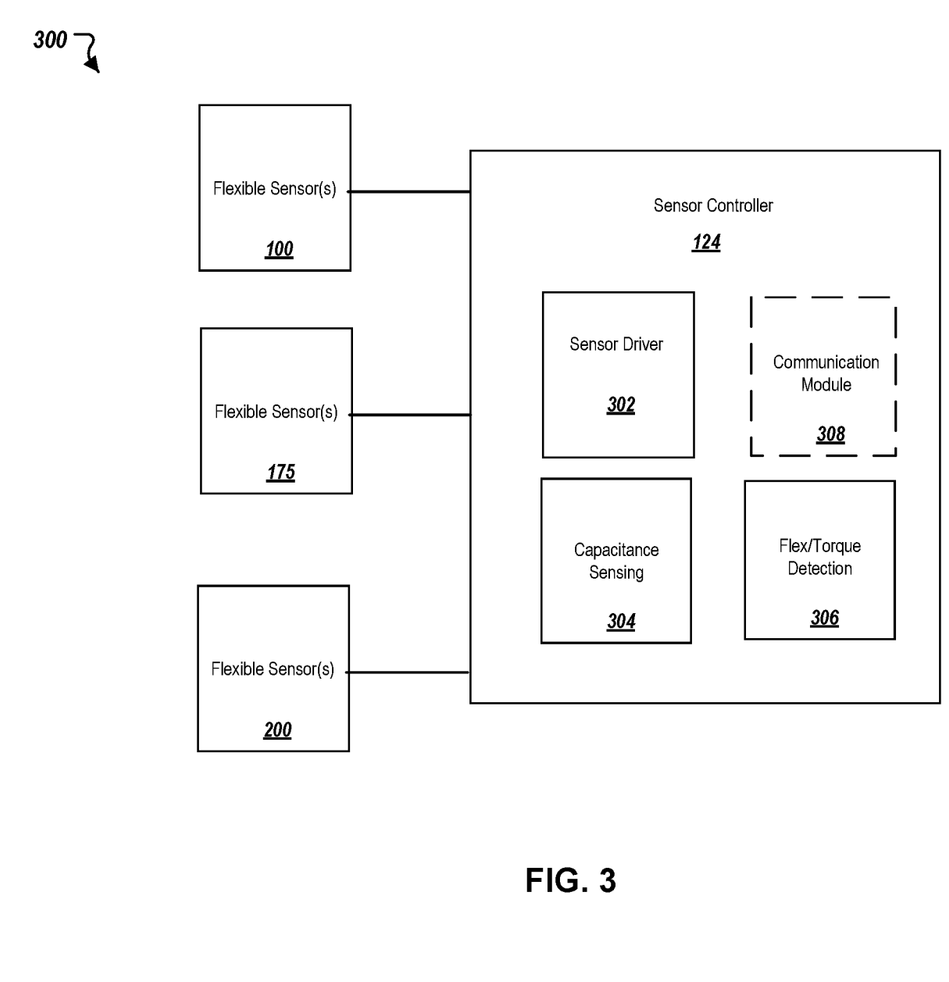
FIG. 3 is a block diagram of an example system for controlling one or more flex sensors according to implementations of the present disclosure.

FIG. 3 is a block diagram of an example system 300 for controlling one or more flexible sensors according to implementations of the present disclosure. The system 300 includes one or more flexible sensors (e.g., sensors 100, 175, and/or 200) communicably coupled to a sensor controller 124. As shown in FIGS. 1A and 2, the sensor controller 124 may be located on the same PCB one or more of the sensor(s). However, in some implementations, the sensor controller 124 can be remote from one or more of the sensors. In such implementations, the sensor(s) can be communicably coupled to the sensor controller 124 by a wired interface including wires extending between the sensor(s) and the sensor controller 124.

The sensor controller 124 includes a sensor driver 302, a capacitance sensing module 304, a flex/torque detection module 306, and, optionally, a communication module 308. The sensor controller 124 can include one or more processors or microcontrollers. The sensor controller 124 controls the operation of each of the sensor driver 302, the capacitance sensing module 304, a flex/torque detection module 306, and, optionally, the communication module 308.

The sensor driver 302 can be implemented as a hardware or software module of the sensor controller 124. The sensor driver 302 provides an electrical driving signal to the capacitive structure(s) on the sensor(s). The driving signal can be an oscillating electrical signal at a given frequency. In some implementations, the sensor driver 302 includes a Schmidt trigger coupled to a capacitive structure (e.g., a relaxation oscillator type circuit).

The capacitance sensing module 304 can be implemented as a hardware or software module of the sensor controller 124. The capacitance sensing module 304 can detect changes in the capacitance of sensor capacitive structure(s) based changes in the driving signal caused by capacitance changes. For example, changes in the capacitance of a capacitive structure can cause a change in the frequency of a driving signal or a change in the duty cycle (e.g. pulse width modulation) of a driving signal. The capacitance sensing module 304 can detect such changes in the driving signal. For example, the capacitance sensing module 304 can include a counter that counts pulses of the driving signal to detect frequency changes. That is, a change in the number of pulses over a given period of time would represent a change in the frequency of the driving signal and a corresponding change in the capacitance of a capacitive structure.

The flex/torque detection module 306 can be implemented as a hardware or software module of the sensor controller 124. In some implementations, the flex/torque detection module can 306 can include a database (e.g., a lookup table) calibrated to associate various changes in capacitance of a capacitive structure to flex or torque values of a mechanical structure. In some implementations, the flex/torque detection module 306 may not directly associate capacitance to flex/torque values, but can associated related changes in the driving signal such as changes in frequency or changes in pulse count to corresponding flex/torque values of a mechanical structure.

In some implementations, as discussed above, the sensor controller 124 can use differential changes in capacitance between multiple capacitive structures to determine flex/torque of a mechanical structure. In such implementations, the flex/torque detection module 306 can include a database that is calibrated to correlate data related to differential changes in capacitances to magnitudes and directions of flex/torque values in a mechanical structure. The data can be actual differences in capacitance or data that represents such differences such as differential changes in frequency or pulse counts between driving signals supplied to multiple capacitive structures.

In some implementations, environmental conditions, such as humidity and temperature, may affect the capacitance and, by extension, the displacement measurements. The sensor controller 124 can use differential changes in capacitance between multiple capacitive structures, as discussed above, to minimize the effects of such environmental conditions. For example, environmental conditions should generally effect each capacitive structure on a sensor similarly. Thus, measuring flex sensor displacement distances based on a difference between the capacitance of two capacitive structures (e.g., two capacitive structures on opposite sides of a flexible arm) may reduce or remove the environmental effects on the capacitive structures. In some implementations, the sensor controller 124 may include facilities to measure and compensate for environmental effects such as temperature and/or humidity on the sensor.

In some implementations, the sensor controller 124 includes a communication module 308. The communication module 308 can be implemented as a hardware or software module of the sensor controller 124. The communication module 308 can be a wired communication (e.g., USB) or wireless communication module (e.g., Bluetooth, ZigBee). The communication module 308 can be used to communicate flex/torque data or capacitance data to other remote computing devices, e.g., a laptop, a tablet computer, a control system of a robotic device, a smartphone, etc.

Figure 4:
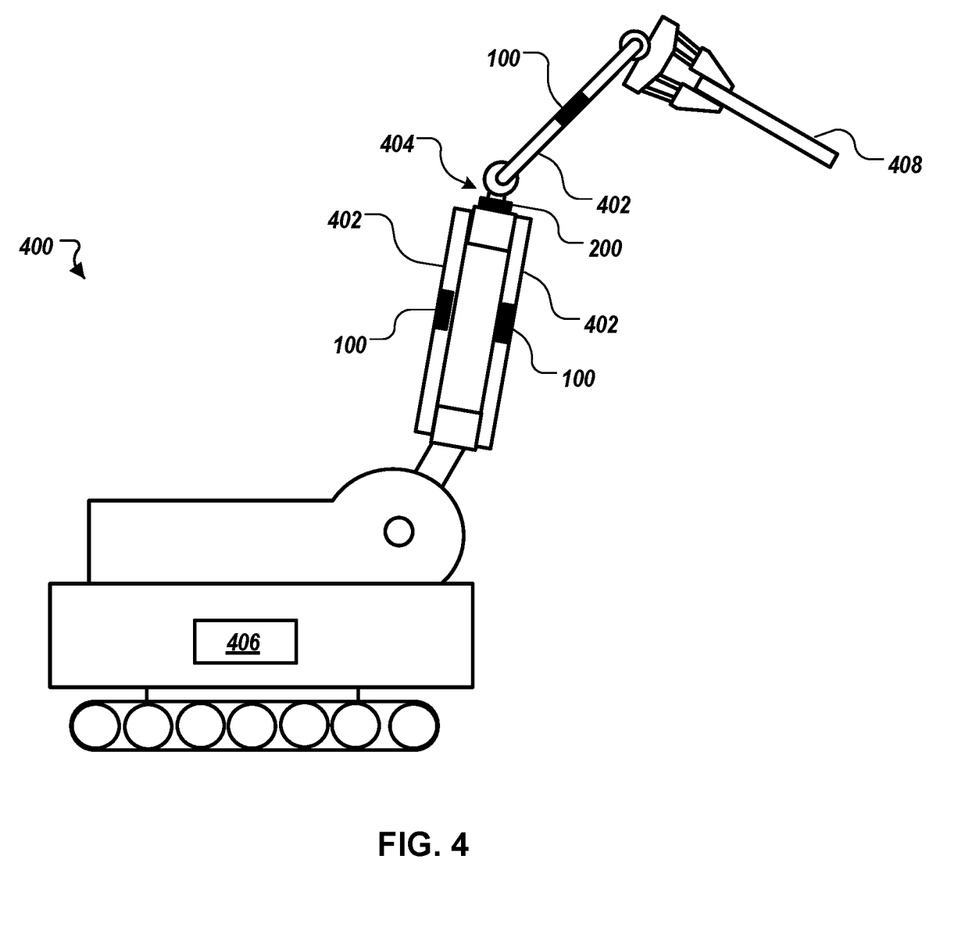
FIG. 4 illustrates an example of flexible sensors coupled to a mechanical device.

FIG. 4 illustrates an example of flexible sensors 100, 200 coupled to a mechanical device 400. The mechanical device 400 can be a robotic device such as a robotic arm. Flexible sensors 100 are attached to various mechanical linkages 402 of the device 400. The sensors 100 can be used to measure flex in the linkages 402 that occur during the operation of the device 400. The sensor 200 can be used to measure the torque at a mechanical joint 404 between linkages 402. The sensors 100 can communicate such measurements to a computer control system 406 of the device 400. The control system 406 can the measurements to control or alter the operation of the device 400. For example, if the device 400 is used to lift a heavy object 408 that causes excessive stress to one or more of the linkages 402 as measured by the sensors 100, the control system 406 can control the device 400 to release the object 408, and possibly prevent damage to the device 400.

In some implementations, the sensors 100, 200 can be integrated into a mechanical linkage 402. For example, the linkage 402 can be formed from a material (e.g., a plastic) suitable for a sensor substrate (e.g., substrate 102 described above). In such implementations, the mechanical linkage itself can be used as the substrate for sensors 100, 200. For example, conductive material can be deposited on appropriate surfaces of the linkage 402 to form capacitive structures directly on the linkage 402 similar those described above with respect to the sensor substrates.

Figure 5:
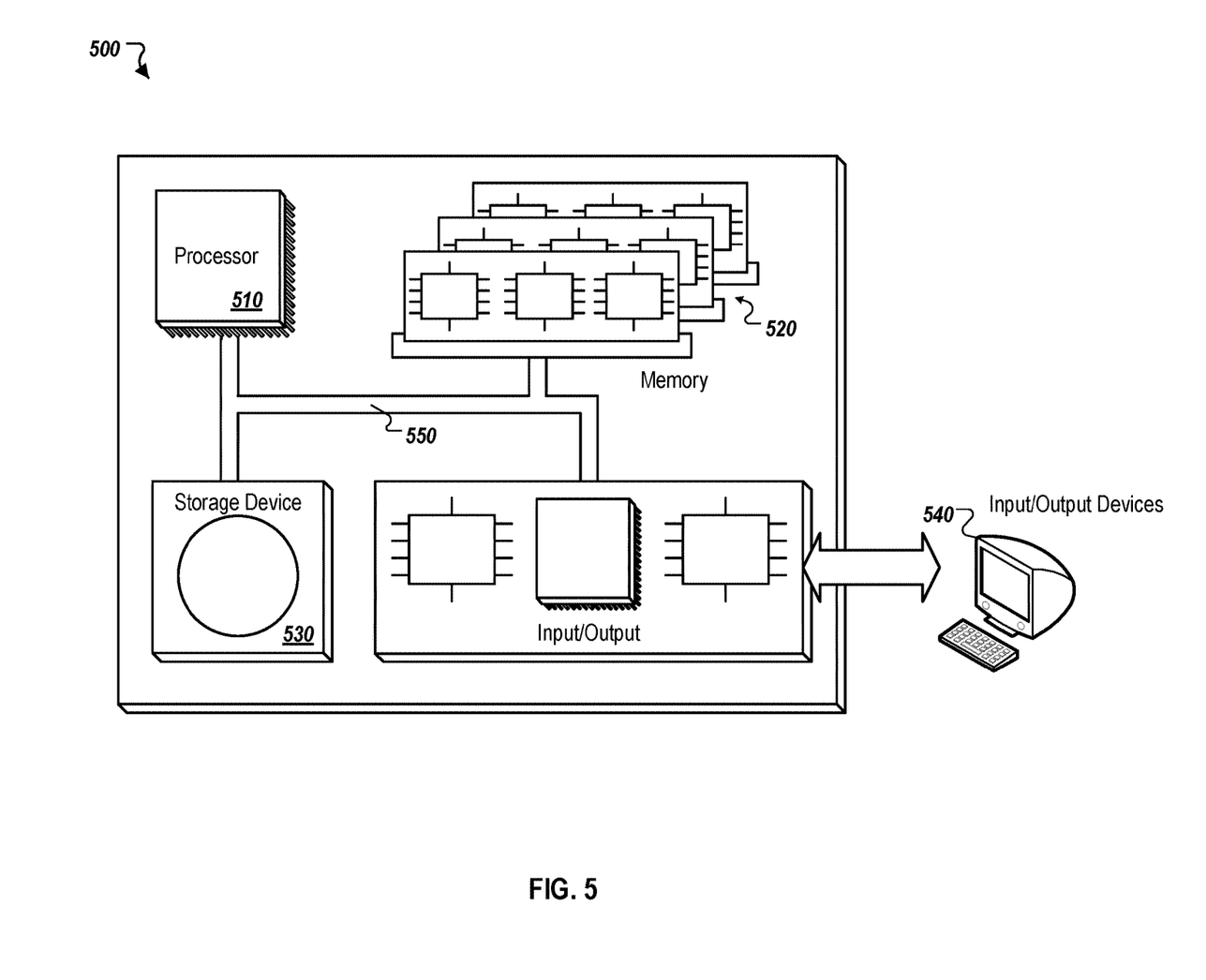
FIG. 5 depicts a schematic diagram of a computer system that may be applied to any of the computer-implemented methods and other techniques described herein.

FIG. 5 is a schematic diagram of a computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., system 500) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and other similar computing devices. Additionally, the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A sensor comprising:
    a flexible substrate comprising a slot extending from an outer edge of the flexible substrate to an inner portion of the flexible substrate;
    a capacitive structure on the flexible substrate comprising:
        a first electrode on a first portion of the flexible substrate on a first side of the slot; and
        a second electrode on a second portion of the flexible substrate on a second side of the slot, the second electrode aligned with the first electrode across the slot; and
    mechanical coupling sites arranged on opposite sides of the capacitive structure.

2. The sensor of claim 1, wherein the substrate is configured to flex at the slot in response to torque applied at the mechanical coupling sites, wherein the flex of the substrate causes a distance between the first electrode and the second electrode to vary.

3. The sensor of claim 1, wherein the slot is sized to permit a portion of a mechanical joint to extend therethrough.

4. The sensor of claim 1, further comprising a control circuit electrically connected to the capacitive structure.

5. The sensor of claim 4, wherein the control circuit is configured to apply a drive signal to the capacitive structure.

6. The sensor of claim 5, wherein the drive signal comprises an electrical signal oscillating at a frequency, and
    wherein the control circuit is configured to measure variations in a capacitance between the first electrode and the second electrode based on detecting changes in the frequency of the drive signal.

7. The sensor of claim 4, wherein the control circuit is configured to measure variations in a capacitance between the first electrode and the second electrode.

8. The sensor of claim 7, wherein the control circuit is configured to determine an amount of torque about a mechanical joint to which the sensor is attached based on the measured variations in the capacitance.

9. The sensor of claim 7, wherein the control circuit is configured to determine a direction of torque about a mechanical joint to which the sensor is attached based on whether the measured variations in the capacitance indicate an increase or a decrease in the capacitance.

10. The sensor of claim 7, wherein the control circuit comprises a microprocessor.

11. The sensor of claim 7, wherein the control circuit is configured to determine an amount of torque about a mechanical joint to which the sensor is attached by correlating the measured variations in the capacitance to a flexure value among a set of stored values in a lookup table.

12. A robotic device comprising:
- a first member coupled to a second member at a mechanical joint; and
- a sensor coupled to the first member and to the second member across the mechanical joint, the sensor comprising:
  - a flexible substrate comprising a slot extending from an outer edge of the flexible substrate to an inner portion of the flexible substrate;
  - a capacitive structure on the flexible substrate comprising:
    - a first electrode on a first portion of the flexible substrate on a first side of the slot; and
    - a second electrode on a second portion of the flexible substrate on a second side of the slot, the second electrode aligned with the first electrode across the slot; and
  - mechanical coupling sites arranged on opposite sides of the capacitive structure,
- wherein the first member is coupled to a first of the mechanical coupling sites,
- wherein the second member is coupled to a second of the mechanical coupling sites, and
- wherein a portion of the mechanical joint to extends through the slot in the flexible substrate.

13. The robotic device of claim 12, wherein the substrate is configured to flex at the slot in response to torque applied at the mechanical coupling sites, wherein the flex of the substrate causes a distance between the first electrode and the second electrode to vary.

14. The robotic device of claim 12, further comprising a control circuit electrically connected to the capacitive structure.

15. The robotic device of claim 14, wherein the control circuit is configured to apply a drive signal to the capacitive structure.

16. The robotic device of claim 15, wherein the drive signal comprises an electrical signal oscillating at a frequency, and
wherein the control circuit is configured to measure variations in a capacitance between the first electrode and the second electrode based on detecting changes in the frequency of the drive signal.

17. The robotic device of claim 14, wherein the control circuit is configured to measure variations in a capacitance between the first electrode and the second electrode.

18. The robotic device of claim 17, wherein the control circuit is configured to determine an amount of torque about the mechanical joint based on the measured variations in the capacitance.

19. The robotic device of claim 17, wherein the control circuit is configured to determine a direction of torque about the mechanical joint based on whether the measured variations in the capacitance indicate an increase or a decrease in the capacitance.

20. The robotic device of claim 17, wherein the control circuit is configured to determine an amount of torque about the mechanical joint by correlating the measured variations in the capacitance to a flexure value among a set of stored values in a lookup table.

* * * * *